(12) United States Patent
Doyle et al.

(10) Patent No.: US 11,280,381 B2
(45) Date of Patent: Mar. 22, 2022

(54) ACTIVE DAMPER FOR SEMICONDUCTOR METROLOGY AND INSPECTION SYSTEMS

(71) Applicant: ONTO INNOVATION INC., Wilmington, MA (US)

(72) Inventors: Paul A. Doyle, Milpitas, CA (US); Mark James Franceschi, Millbrae, CA (US); Morgan A. Crouch, Hillsboro, OR (US); Kenneth E. James, Morgan Hill, CA (US)

(73) Assignee: Onto Innovation Inc., Wilmington, MA (US)

( * ) Notice: Subject to any disclaimer, the term of this patent is extended or adjusted under 35 U.S.C. 154(b) by 278 days.

(21) Appl. No.: 16/422,511

(22) Filed: May 24, 2019

(65) Prior Publication Data
US 2020/0370619 A1 Nov. 26, 2020

(51) Int. Cl.
| | | |
|---|---|---|
| *F16F 15/02* | (2006.01) | |
| *F16F 15/027* | (2006.01) | |
| *F16F 7/10* | (2006.01) | |
| *G01N 21/95* | (2006.01) | |
| *F16F 9/53* | (2006.01) | |
| *F16F 7/116* | (2006.01) | |

(52) U.S. Cl.
CPC .......... *F16F 15/027* (2013.01); *F16F 7/1017* (2013.01); *F16F 7/116* (2013.01); *F16F 9/532* (2013.01); *F16F 9/535* (2013.01); *G01N 21/9501* (2013.01)

(58) Field of Classification Search
CPC ........ F16F 15/027; F16F 7/1017; F16F 7/116; F16F 9/532; F16F 9/535; G01N 21/9501

USPC .................................................. 188/267.1
See application file for complete search history.

(56) References Cited

U.S. PATENT DOCUMENTS

| | | | |
|---|---|---|---|
| 5,249,784 A | 10/1993 | Murakami et al. | |
| 5,874,820 A * | 2/1999 | Lee ........................ | G03F 7/709 |
| | | | 318/575 |

(Continued)

FOREIGN PATENT DOCUMENTS

| | | |
|---|---|---|
| CN | 1587739 A | 3/2005 |
| WO | 95-10728 A1 | 4/1995 |

OTHER PUBLICATIONS

International Search Report and Written Opinion dated Sep. 1, 2020, PCT/US2020/033450, filed May 18, 2020.

(Continued)

*Primary Examiner* — Melanie Torres Williams
(74) *Attorney, Agent, or Firm* — Paradice and Li LLP (57) ABSTRACT

A damper for a semiconductor metrology or inspection system includes a pair of parallel plates with a fluid with a variable viscosity retained between plates. At least one wire is disposed between the plates, which may include one or more sets of lands and grooves. In some implementations, both plates include intermeshed lands and grooves. A controller is configured to provide a current to the at least one wire in order to adjust an electromagnetic field or a current through the fluid. The fluid may be a magnetorheological fluid or an electrorheological fluid in which the viscosity of the fluid is variable based on the electromagnetic field or current through the fluid. The controller varies the current applied to the wire to adjust the viscosity of the fluid to alter the damping of the semiconductor metrology or inspection system based on movement of the stage.

42 Claims, 9 Drawing Sheets

(56) References Cited

U.S. PATENT DOCUMENTS

| | | | |
|---|---|---|---|
| 5,944,152 A * | 8/1999 | Lindsay | F16F 9/12 |
| | | | 188/296 |
| 7,225,905 B2 * | 6/2007 | Namuduri | F16F 9/535 |
| | | | 188/267.1 |
| 9,546,946 B2 * | 1/2017 | Golovanevsky | G10K 11/1785 |
| 2004/0057817 A1 | 3/2004 | Hazelton | |
| 2010/0089712 A1 | 4/2010 | Butler et al. | |
| 2014/0209779 A1 | 7/2014 | Kropp et al. | |

OTHER PUBLICATIONS

Poynor, James, "Innovative Designs for Magneto-Rheological Dampers," Advanced Vehicle Dynamics Laboratory, Virginia Polytechnic Institute and State University, writing.engr.psu.edu_me5984_poynor.

Wang, J., "Magnetorheological fluid devices: principles, characteristics and applications in mechanical engineering," Proc Instn Mech Engrs vol. 215 Part L.

Spaggiari, A., "Properties and applications of Magnetorheological fluids," Frattura ed Integrita Strutturale, 23 (2013) 57-61; DOI: 10.3221/IGF-ESIS.23.06.

* cited by examiner

```
┌─────────────────────────────────────────────────────────────┐
│  Provide a first plate having a first surface that extends  │
│  along a first plane, and a second plate having a second    │
│  surface that extends along a second plane that is parallel │
│  with the first plane, wherein one of the first plate and   │──1102
│  the second plate is mounted to the semiconductor metrology │
│  or inspection system, with at least one wire disposed      │
│  between the first plate and the second plate and a fluid   │
│  with a viscosity that is variable retained between the     │
│  first plate and the second plate                           │
└─────────────────────────────────────────────────────────────┘
                              │
                              ▼
┌─────────────────────────────────────────────────────────────┐
│  Increase a current in the at least one wire to increase    │
│  the viscosity of the fluid between the first plate and the │──1104
│  second plate to increase an amount of damping provided to  │
│  the semiconductor metrology or inspection system           │
└─────────────────────────────────────────────────────────────┘
                              │
                              ▼
┌─────────────────────────────────────────────────────────────┐
│  Decrease the current in the at least one wire to decrease  │
│  the viscosity of the fluid between the first plate and the │──1106
│  second plate to decrease the amount of damping provided to │
│  the semiconductor metrology or inspection system           │
└─────────────────────────────────────────────────────────────┘
```

Fig. 18

ACTIVE DAMPER FOR SEMICONDUCTOR METROLOGY AND INSPECTION SYSTEMS

FIELD OF THE INVENTION

A vibration isolation system for semiconductor metrology or inspection systems, and more particularly to an actively controlled damper.

BACKGROUND

Semiconductor and other similar industries, often use metrology or inspection equipment for evaluation of substrates during processing. Metrology or inspection equipment is required to measure the physical parameters or detect defects on wafers that are extremely small, and accordingly, are necessarily sensitive instruments. The sensitivity of metrology and inspection equipment renders the equipment to sensitive to vibrations from external and internal sources. For example, vibrations from the floor upon which the metrology and inspection equipment may adversely affect evaluation results. Additionally, vibrations from internal sources, such as moving wafer stages, may also adversely affect evaluation results and may decrease throughput due to the need to wait for vibrations to dissipate after every stage movement. For example, in systems with periodic stage movement, e.g., the stage moves from measurement site to measurement site, or continuous stage movement, the reaction forces from stage acceleration excite resonant frequencies of critical components in the system, requiring the delay of measurements until after vibration levels diminish, thereby reducing throughput of the system. It is, thus, desirable to reduce the amount of vibrations experienced by metrology or inspection equipment and to reduce the measurement delay caused by waiting for vibrations to dissipate.

SUMMARY

A damper for a semiconductor metrology or inspection system includes a pair of parallel plates with a fluid with a variable viscosity retained between plates. At least one wire is disposed between the plates, which may include one or more sets of lands and grooves. In some implementations, both plates include intermeshed lands and grooves. A controller is configured to provide a current to the at least one wire in order to adjust an electromagnetic field or a current through the fluid. The fluid may be a magnetorheological fluid or an electrorheological fluid in which the viscosity of the fluid is variable based on the electromagnetic field or current through the fluid. The controller varies the current applied to the wire to adjust the viscosity of the fluid to alter the damping of the semiconductor metrology or inspection system based on movement of the stage.

In one implementation, a damper for a semiconductor metrology or inspection system includes a first plate having a first surface that extends along a first plane; a second plate having a second surface that extends along a second plane that is parallel with the first plane, wherein one of the first plate and the second plate is configured to be mounted to the semiconductor metrology or inspection system; at least one wire disposed between the first plate and the second plate; a fluid with a viscosity that is variable and is retained between the first plate and the second plate; and a controller coupled to the at least one wire and configured to provide a current to the at least one wire to alter the viscosity of the fluid to adjust an amount of damping provided to the semiconductor metrology or inspection system.

In one implementation, a method of actively damping vibration of a semiconductor metrology or inspection system includes providing a first plate having a first surface that extends along a first plane, and a second plate having a second surface that extends along a second plane that is parallel with the first plane, wherein one of the first plate and the second plate is mounted to the semiconductor metrology or inspection system, with at least one wire disposed between the first plate and the second plate and a fluid with a viscosity that is variable retained between the first plate and the second plate; increasing a current in the at least one wire to increase the viscosity of the fluid between the first plate and the second plate to increase an amount of damping provided to the semiconductor metrology or inspection system; and decreasing the current in the at least one wire to decrease the viscosity of the fluid between the first plate and the second plate to decrease the amount of damping provided to the semiconductor metrology or inspection system.

In one implementation, a damper for a semiconductor metrology or inspection system having a stage that moves includes a pair of parallel plates, wherein one of the plates is configured to be mounted to the semiconductor metrology or inspection system; at least one wire disposed between the parallel plates; a fluid with a viscosity that is variable and is retained between the pair of parallel plates; and a controller coupled to the at least one wire, the controller being configured to vary a current applied to the at least one wire to adjust the viscosity of the fluid to alter damping of the semiconductor metrology or inspection system based on movement of the stage.

DETAILED DESCRIPTION

An actively controlled damper for a semiconductor metrology or inspection system adjusts its damping properties based on the movement of a stage in the semiconductor metrology or inspection system. For example, the damping properties may be increased during acceleration of the stage to dampen out low frequency excitation and motion and may be decreased when the stage is stationary or moving at a constant speed to assist in isolating higher frequencies. The actively controlled damper uses a fluid having a variable viscosity, such as an electrorheological fluid or a magnetorheological fluid, to adjust the damping properties. The viscosity of the fluid and, thus, the damping force in the actively controlled damper is variable based on an applied current or electromagnetic field. Accordingly, the damping properties of the actively controlled damper may be easily and quickly adjusted.

Moreover, the control of the damping properties of the actively controlled damper is based on the controlled motion of the stage and thus does not require the use of motion sensors or a feedback loop. The control of the damping properties enables an increase in damping during stage motion (acceleration) to dampen out low frequency excitation and motion and to decrease damping when the stage is not moving (or accelerating) to dampen out high frequency excitation without complicated control electronics and feedback systems. In comparison, active isolation systems typically require actuators, such as voice coil motor, piezoelectric actuators, etc. and require the use of motion sensors and a closed loop feedback controller to actively compensate of motion in the system. The use of the actively controlled damper with control based on the controlled motion of the stage advantageously simplifies the control system compared to other active isolation systems, thereby reducing cost of the system.

Figure 1:
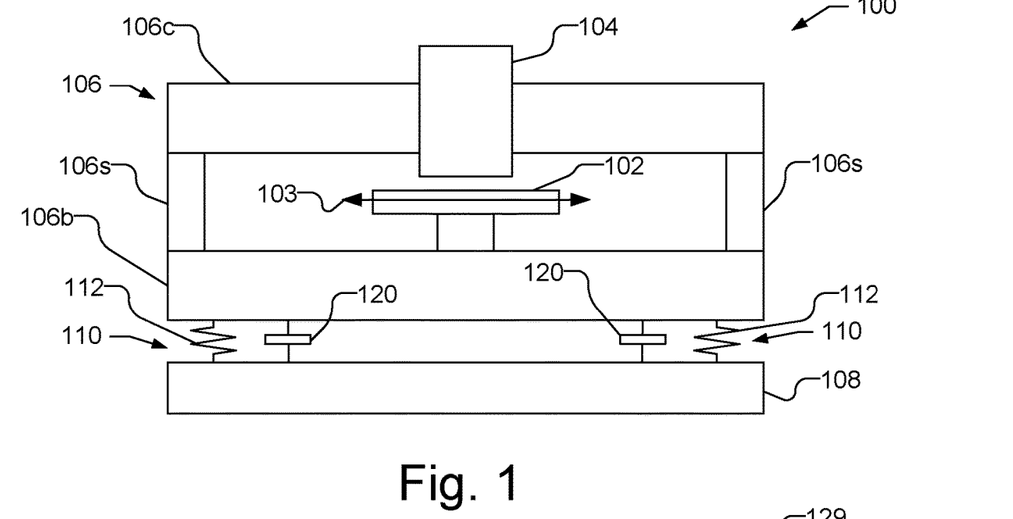
FIG. 1 is a schematic view of a semiconductor metrology or inspection system with an actively controlled vibration isolation system capable of adjusting an amount of damping provided to the semiconductor metrology or inspection system.

FIG. 1, by way of example, is a schematic view of a semiconductor metrology or inspection system 100 that includes a vibration isolation system 110 that may be actively controlled to adjust an amount of damping provided to the semiconductor metrology or inspection system. The semiconductor metrology or inspection system 100 is illustrated as including a stage 102, an optical head 104, and a housing 106, e.g., defined by sidewalls 106s, base 106b and ceiling 106c. The semiconductor metrology or inspection system 100 is illustrated as being mounted to a floor 108 with the vibration isolation system 110, which includes passive isolation mounts 112 and actively controlled dampers 120.

As illustrated with arrows 103, the stage 102 is movable, e.g., to place a sample (not shown) at desired positions with respect to the optical head 104. The stage 102, for example, may be capable of horizontal motion in either Cartesian (i.e., X and Y) coordinates, or Polar (i.e., R and θ) coordinates or some combination of the two. The stage 102 may also be capable of vertical motion along the Z coordinate. If desired, the optical head 104, or a portion thereof, may be moveable or both the stage 102 and the optical head 104 may be moveable to produce the desired relative motion between the sample and the optical head 104.

The vibration isolation system 110 reduces vibrations experienced by the semiconductor metrology or inspection system 100, and more specifically, the optical head 104, from external sources, e.g., from the floor 108, and from internal sources, e.g., from movement of the stage 102. The passive isolation mounts 112 may be, e.g., springs or elastomer mounts or air isolators, support the weight of the semiconductor metrology or inspection system 100 and reduce vibrations experienced from the floor 108. The actively controlled dampers 120 provide damping of vibrations experienced by the semiconductor metrology or inspection system 100. For example, if the passive isolation mounts 112 are springs, the actively controlled dampers 120 may provide all damping for the semiconductor metrology or inspection system 100, and where the passive isolation mounts 112 are elastomer or air isolators, the actively controlled dampers 120 may provide additional damping for the semiconductor metrology or inspection system 100. It should be understood that while the vibration isolation system 110 is illustrated in one direction in FIG. 1, e.g., the vertical direction, the vibration isolation system 110 may have multidirectional stiffness to account for varying vibration isolation requirements in different directions.

The actively controlled dampers 120 include a fluid that has a variable viscosity, such as an electrorheological fluid or a magnetorheological fluid. The viscosity of the fluid in the actively controlled dampers 120 may be altered by application of a current (electrorheological fluid) or a magnetic field (magnetorheological fluid) to change the amount of force output of the damper. During a metrology or inspection measurement of a sample with the stage 102 either stationary or moving at a constant speed, the damping output of the actively controlled dampers 120 may be decreased to help with higher frequency isolation and may be increased during stage accelerations to dampen out low frequency excitation and motion.

Figure 2A:
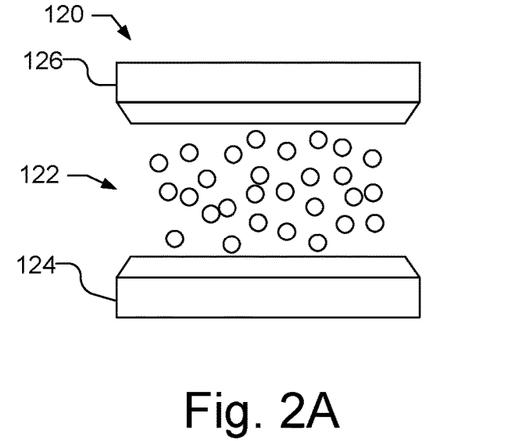
FIGS. 2A and 2B illustrate randomly distributed and aligned particles, respectively, in the fluid between two plates of an actively controlled damper.
Figure 2B:
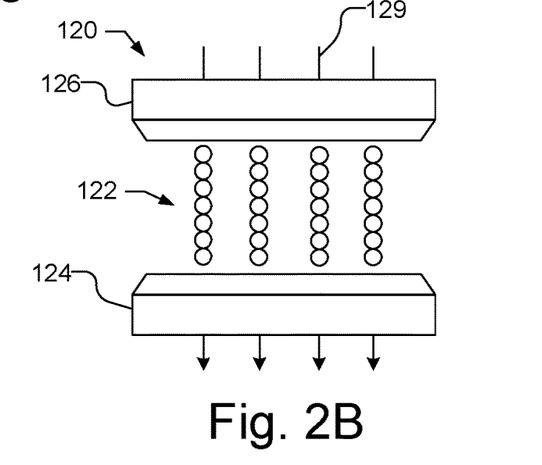

FIGS. 2A and 2B, for example, illustrate particles in the fluid 122 of the actively controlled dampers 120 between two plates 124 and 126. FIG. 2A illustrates the behavior of the particles in the fluid 122 when there is no external magnetic field, showing that the particles in the fluid 122 are randomly distributed. FIG. 2B illustrates the particles in the fluid 122 when an external magnetic field 129 is applied, showing that the particles in the fluid 122 organize into chain-like structures. While FIGS. 2A and 2B illustrate the behavior of a magnetorheological fluid in response to the application of a magnetic field, it should be understood that electrorheological fluid has a similar behavior in response to the application of an electric current.

Figure 3A:
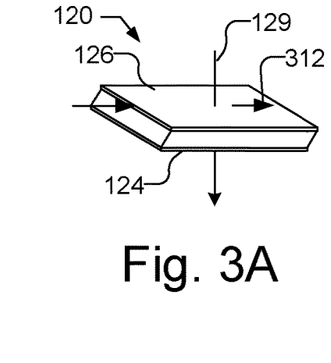
FIGS. 3A and 3B respectively illustrate shear and squeeze modes of operation of an actively controlled damper.
Figure 3B:
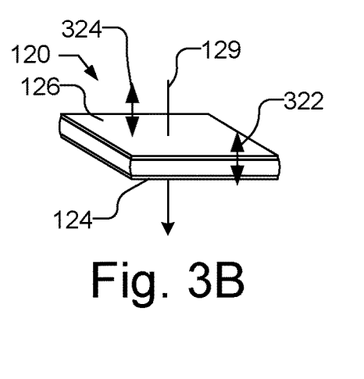

FIGS. 3A and 3B illustrate two basic modes of operation of the actively controlled dampers 120, including a shear mode (FIG. 3A) and a squeeze mode (FIG. 3B). In the shear mode (FIG. 3A), the resistance to movement 312 (sliding or rotating) of the plates 124 and 126 in response to a force 314 may be controlled by the application of the magnetic field 129 in a direction that is normal to the direction of the movement 312. In the squeeze mode (FIG. 3B), the resistance to displacement 322 between the plates 124 and 126 in response to a force 324 may be controlled by the application of the magnetic field 129 in a direction that is parallel to the direction of the displacement 322. In either mode of operation, the applied magnetic field regulates the yield stress of the fluid 122 and changes its apparent viscosity. It should be understood that, while FIGS. 3A and 3B are related to modes of operation of a magnetorheological fluid, the modes of operation of an electrorheological fluid is similar to in response to the application of a current.

Figure 4:
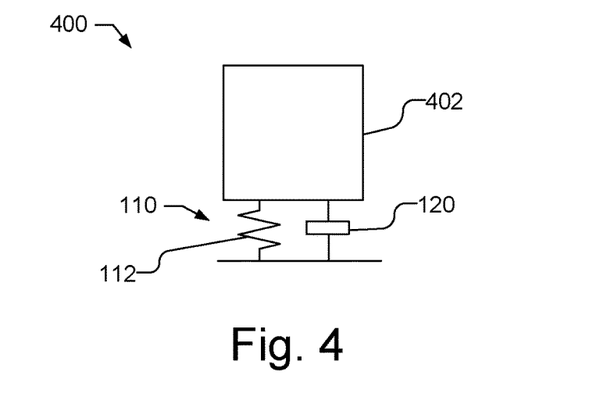
FIG. 4 illustrates an idealized spring mass damper system with 1 degree of freedom (DOF) (in the vertical direction).

The lowest resonant frequencies in the semiconductor metrology or inspection system 100 are the floating mass moving vertically up and down on the vibration isolation system 110 and the floating mass rocking back and forth in pitch or roll on the vibration isolation system 110. FIG. 4, by way of example, illustrates an idealized example of a 1 degree of freedom (DOF) (in the vertical direction) spring mass damper system 400 including a floating mass 402 on a vibration isolation system 110, including a single passive isolation mount 112 and a single damper 120. The Laplace domain transfer function for base displacement to mass displacement for the 1 DOF system 400 with base excitation is:

$$H_1(s) = \frac{2\zeta\omega_n s + \omega_n^2}{s^2 + 2\zeta\omega_n s + \omega^2} \quad \text{eq. 1}$$

$$H_1(s) = \frac{2\zeta\omega_n s + \omega_n^2}{s^2 + 2\zeta\omega_n s + \omega_n^2}$$

In equation 1, $H_1$ is the damping magnitude, s is the Laplace variable, $\zeta$ is the damping ratio, $\omega_n$ is the resonant frequency of the oscillator.

Figure 5:
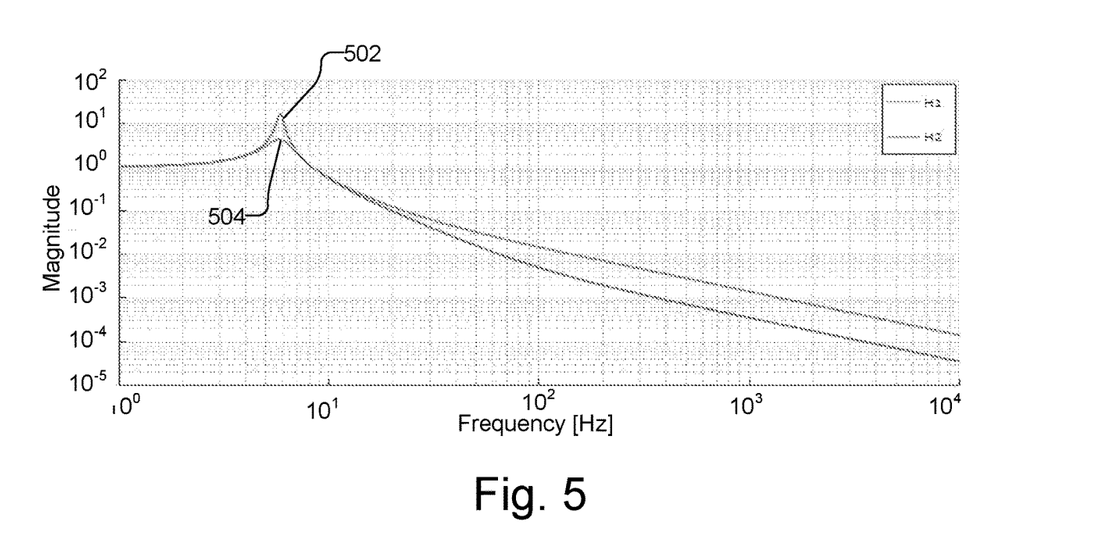
FIG. 5 illustrates plots of a transfer function for two different damping levels for the idealized spring mass damper system shown in FIG. 4.

FIG. 5 illustrates, by way of example, plots of the transfer function of equation 1 for a resonant frequency $\omega_n$ of approximately 6 Hz and a damping ratio $\zeta$ of approximately 3, for two damping levels $H_1$ (curve 502) and $H_2$ (curve 504). The two different curves illustrate how the transmissibility changes for the frequency range depending on how much damping is coming from the actively controlled dampers 120 in the vibration isolation system 110. The damping level $H_2$ is four times (4×) that of $H_1$, which was selected to illustrate a clear change in the plots of damping ratios. As can be seen, the response for the damping level $H_2$ 504 at the vertical resonant frequency of ~6 Hz decreases with respect to damping level $H_1$ 502 with a tradeoff of the response at higher frequencies being increased. Thus, the damping level $H_1$ 502 is better that damping level $H_2$ 504 at isolating higher resonant frequency parts of the structure, while damping level $H_2$ 504 is better at decreasing the amount of motion from the stage moving. Thus, by activating the actively controlled dampers 120 in the vibration isolation system 110, the damping will increase thereby reducing the peak and accordingly, the motion from the moving stage will be reduced.

Thus, the actively controlled dampers 120 in the vibration isolation system 110 may quickly adjust damping properties by adjusting the viscosity of the fluid 122, through the application of a current, e.g., to produce a magnetic field if the fluid 122 is a magnetorheological fluid, or to apply the current across the fluid if the fluid 122 is an electrorheological fluid. The application of a magnetic field or electric current alters the viscosity of the fluid 122, which alters the force output of the actively controlled dampers 120 that comes from controlling the flow of fluid, shearing the fluid, or squeezing the fluid. Accordingly, during a metrology or inspection measurement of a wafer with the stage either stationary or moving at a constant speed, the damping output of the actively controlled dampers 120 may be controlled to be low for higher frequency isolation, and during stage accelerations, the damping output of the actively controlled dampers 120 may be controlled to be high for low frequency excitation and motion. Thus, the actively controlled dampers 120 can be controlled to change the damping properties of the isolators when the stage accelerates for instances such as moving from measurement site to measurement site or during load and un-load.

Figure 6:
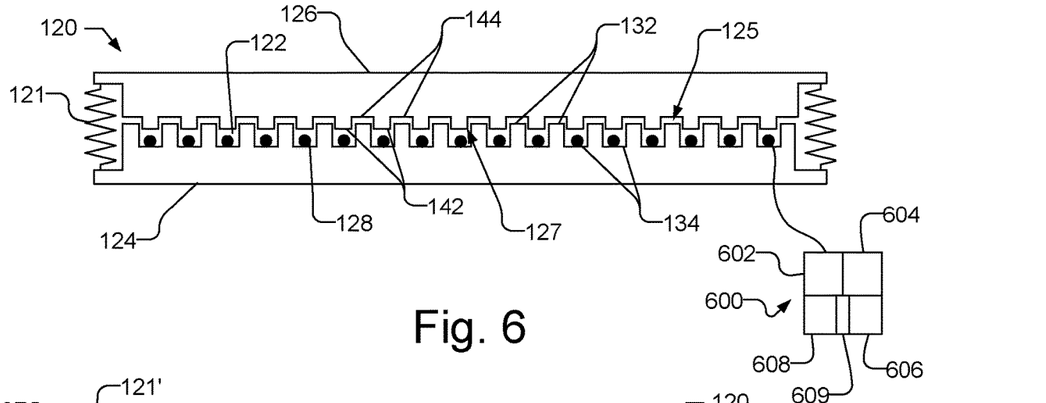
FIG. 6 illustrates a side view of an actively controlled damper.
Figure 7:
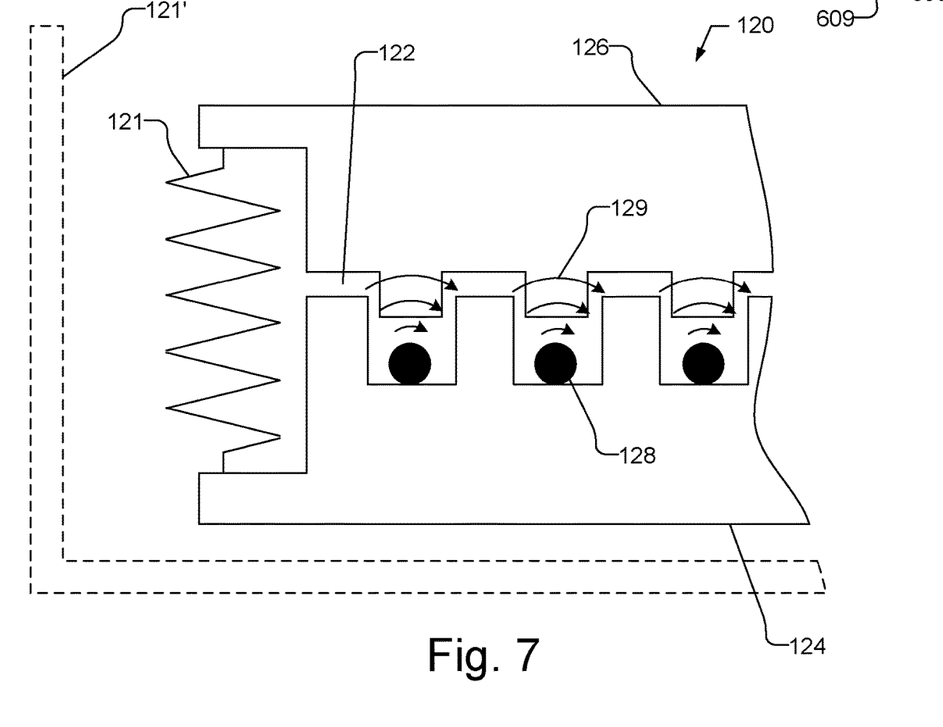
FIG. 7 illustrates close up side view of the actively controlled damper shown in FIG. 6.

FIGS. 6 and 7 illustrate side views of an embodiment of an actively controlled damper 120 and a portion of the actively controlled damper 120, respectively. As illustrated, the damper 120 includes a pair of parallel plates in which at least one plate has a set of lands and grooves. For example, a first plate 124 has a surface 125 that extends along a first plane and includes a set of lands 132 and grooves 134. A second plate 126 has a surface 127 that extends along a second plane that is parallel with the first plane. As illustrated, the surface 127 of the second plate 126 may also include a set of lands 142 and grooves 144, although in some embodiments, the surface 127 may be flat, i.e., have no lands and grooves. In one implementation, as illustrated, the lands 132 of the first plate 124 may fit within the grooves 144 of the second plate 126 and the lands 142 from the second plate 126 may fit within the grooves 134 the first plate 124. One of the first plate 124 and the second plate 126 is configured to be mounted to the semiconductor metrology or inspection system 100. For example, as indicated in FIG. 1, the top plate, e.g., plate 124, may be configured to be mounted to the semiconductor metrology or inspection system 100, while the bottom plate, e.g., plate 126, may be configured to be mounted to the floor or a frame 108.

A fluid 122 with a viscosity that is variable, e.g., a magnetorheological fluid or electrorheological fluid, is retained between the first plate 124 and the second plate 126. By way of example, one or more flexible connectors 121 connected to the first plate 124 and the second plate 126 may be used to retain the fluid 122. As illustrated, the flexible connectors 121 may be sidewalls, and accordingly, are sometimes referred to herein as sidewalls 121. For example, the flexible connector 121 may be formed from a single piece of, e.g., nickel or a flexible polymer, such as a molded rubber bellows, which may be produced using materials such as Viton, Buna, EPDM (ethylene propylene diene methylene), etc., or other appropriate flexible material, and which may be corrugated to increase flexibility. The flexible connectors 121 may be welded, glued, or otherwise attached around both the first plate 124 and the second plate 126 to retain the fluid 122 and to enable movement of the first plate 124 and the second plate 126 with respect to each other. In other embodiments, as illustrated with dashed lines in FIG. 7, the sidewall may be formed around but need not contact both the first plate 124 and the second plate 126. For example, the sidewall 121' may be the sides of a container 150 that retains the fluid 122. The first plate 124 may be connected to the bottom of the container 150 and the second plate 126 is not connected to the container 150 (but may be connected to the semiconductor metrology or inspection system 100). The container 150 may be open to the environment or may be closed flexibly sealed allowing movement of the second plate 126 within the container 150 while being connected to the semiconductor metrology or inspection system 100. With the use of sidewalls 121' from container 150, there is no need for the corrugated sidewalls 121.

The damper 120 includes at least one wire 128 disposed in the grooves 134 in the first plate 124. By way of example, the wire 128 illustrated in FIGS. 6 and 7 may be an electromagnetic coil wire, which produces a magnetic field 129, as illustrated by arrows in FIG. 7, when a current is produced in the wire 128, to alter the viscosity of the fluid 122 when the fluid 122 is a magnetorheological fluid. In some implementations, the at least one wire 128 may be used to provide a current across the fluid 122, to alter the viscosity of the fluid 122 when the fluid 122 is a electrorheological fluid.

Additionally, as illustrated in FIG. 6, the actively controlled damper 120 further includes a controller 600 that is coupled to the wire 128 and is configured to provide a current to the wire 128, e.g., to produce a magnetic field 129 or to provide a current across the fluid 122, to alter the viscosity of the fluid 122 thereby adjusting an amount of damping provided to the semiconductor metrology or inspection system 100. The controller 600, for example, may be configured to increase the amount of damping while the stage 102 in the semiconductor metrology or inspection system 100 is moving and to decrease the amount of damping while the stage 102 is not moving.

By way of example, the controller 600 may be a processor, e.g., that controls various components in the semiconductor metrology or inspection system 100, such as the movement of the stage 102, or the controller 600 may be in communication with the control system for the stage 102, and thus, is able to control the damper 120 based on the controlled motion of the stage 102. The controller 600, for example, may be computer, such as a workstation, a personal computer, central processing unit or other adequate computer system, or multiple systems. The controller 600 may include at least one processing unit 602 with memory 604, as well as a user interface 606, which may include a display and input devices, such as a keyboard, mouse, etc. A non-transitory computer-usable storage medium 608 having computer-readable program code embodied may be used by the controller 600 for causing the at least one processor to control the damper 120 and to perform the functions described herein. The data structures and software code for automatically implementing one or more acts described in this detailed description can be implemented by one of ordinary skill in the art in light of the present disclosure and stored, e.g., on the non-transitory computer-usable storage medium 608, which may be any device or medium that can store code and/or data for use by a computer system such as the at least one processing unit 602. The computer-usable storage medium 608 may be, but is not limited to, magnetic and optical storage devices such as disk drives, magnetic tape, compact discs, and DVDs (digital versatile discs or digital video discs). A communication port 609 may also be used to receive instructions that are used to control or program the controller 600 to perform any one or more of the functions described herein and may represent any type of communication connection, such as to the internet or any other computer network. The communication port 609 may further export signals, e.g., with instructions, to another system, such controller of the semiconductor metrology or inspection system 100 if separate controllers are used. Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described.

Figure 8A:
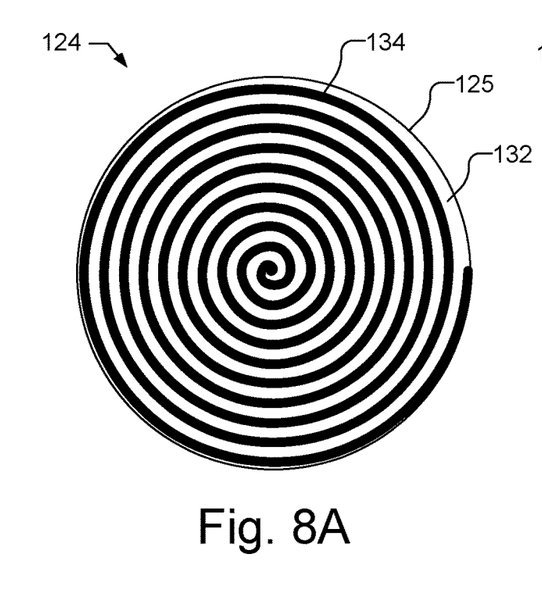
FIGS. 8A, 8B, and 8C illustrate top views of a surface of a plate of the actively controlled damper with lands and grooves in a continuous spiral, concentric circles, and a plurality of lines, respectively.
Figure 8B:
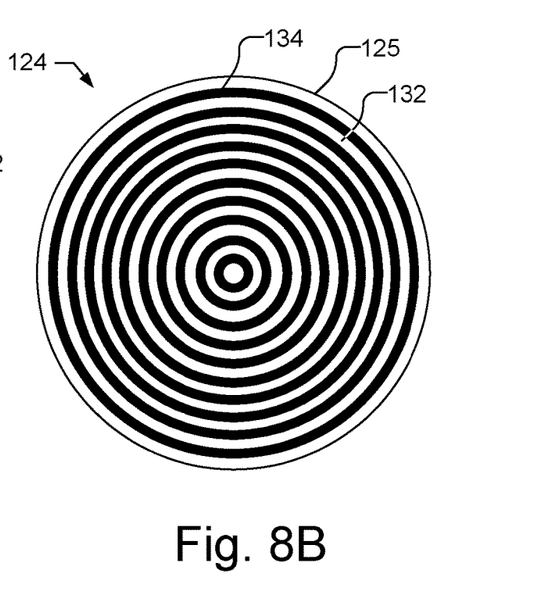
Figure 8C:
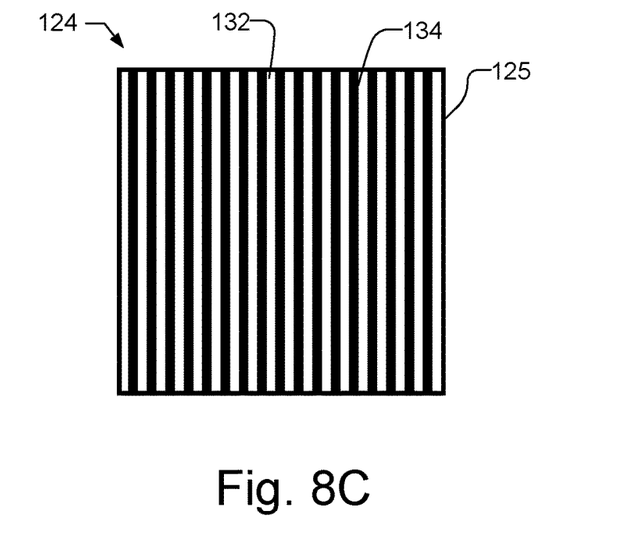

FIGS. 8A, 8B, and 8C illustrate top views of the surface 125 of the first plate 124 with lands 132 and grooves 134, the grooves 134 illustrated with dark lines. As illustrated, the lands 132 and grooves 134 may have various configurations. For example, as illustrated in FIG. 8A, the lands 132 and grooves 134 may have a continuous spiral shape, i.e., there is a single continuously spiraling land 132 and a single continuously spiraling groove 134. With this configuration, one or more continuous wires 128 in the groove 134 and a single connection to controller 600 (shown in FIG. 6), is required to produce a magnetic field normal to the surface 125 of the plate 124. If the wire 128 is used to produce a current across the fluid 122, a second wire in, e.g., a matching spiral groove in the second plate 126 may be used, or alternatively, the second plate 126 itself may be used, as the anode/cathode.

As illustrated, in FIG. 8B, the lands 132 and grooves 134 may be a plurality of concentric circles. In this configuration, each concentric circle may include a separate set of one or more wires 128 that are connected to the controller 600, e.g., through an aperture in the plate 124 (not shown) that may be sealed to retain the fluid 122. The wires 128 in each concentric circle may be controlled to produce a desired magnetic field normal to the surface 125 of the plate 124. If desired, the wires 128 at different concentric circles may be separately controlled with different currents in order to produce a uniform magnetic field. If the wire 128 is used to produce a current across the fluid 122, the second plate 126 may include matching concentric circles with wires, or alternatively, the second plate 126 itself may be used.

As illustrated, in FIG. 8C, the lands 132 and grooves 134 may be a plurality of lines that extend across the surface 125 of the plate 124. In this configuration, each linear groove 134 may include a separate set of one or more wires 128, each connected to controller 600 or each linear groove 134 may be connected with a neighboring groove and a single set of one or more wires 128 may be used in a raster pattern and connected to the controller 600 at a single location. If the wire 128 is used to produce a current across the fluid 122, the second plate 126 may include matching linear grooves with wires, or alternatively, the second plate 126 itself may be used.

With the configuration of lands 132 and grooves 134 in the first plate 124, and the lands 142 and grooves 144 in the second plate 126, if used, the lands increase available damping in the horizontal direction and rotationally, while the surfaces 125 and 127 provide damping in the vertical direction. Accordingly, damper 120 provides variable damping with six-degrees-of-freedom. Moreover, the configuration of lands 132 and grooves 134 in the first plate 124 may enhance the magnetic field produced by the one or more wires in the groove 134.

Figure 9:
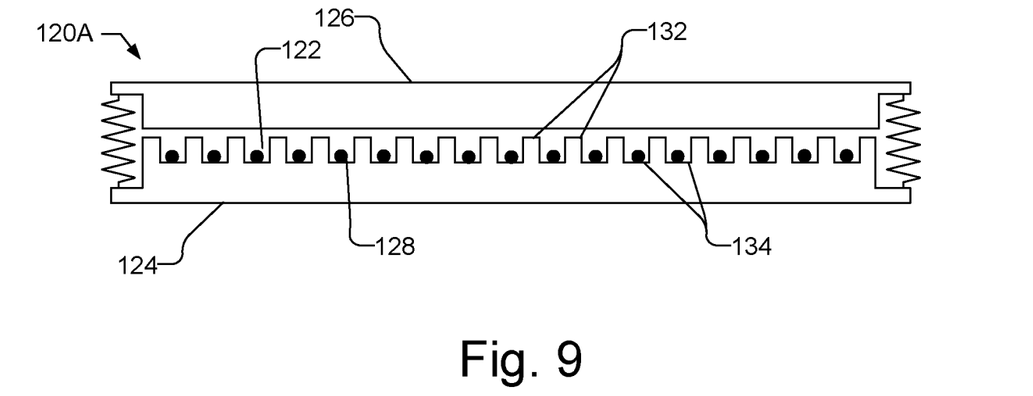
FIG. 9 illustrates a side view of an embodiment of an actively controlled damper with set of lands and grooves.

The actively controlled damper 120 may have other configurations. For example, FIG. 9 illustrates a side view of an embodiment of an actively controlled damper 120A, which is similar to the actively controlled damper 120 shown in FIG. 6, like designated elements being the same, but includes a pair of parallel plates in which only one plate has a set of lands and grooves. As illustrated, the first (bottom) plate 124 includes a set of lands 132 and grooves 134, while the parallel second (top) plate 126, does not include lands and grooves. In other embodiments, the second (top) plate 126 may include lands and grooves, while the first (bottom) plate does not include lands and grooves. Similar to damper 120 in FIG. 6, the damper 120A includes fluid 122 with a controllable viscosity, e.g., a magnetorheological fluid or electrorheological fluid, that is retained between the first plate 124 and the second plate 126 and includes at least one wire 128 is disposed between the first plate 124 and the second plate 126, e.g., in the grooves 134 in the first plate 124. Damper 120A uses a controller 600, shown in FIG. 6, that is coupled to the wire 128, to provide a current to the wire 128 to produce a magnetic field (or to produce a current across the fluid 122 if the fluid is an electrorheological fluid) to alter the viscosity of the fluid 122, thereby adjusting an amount of damping provided to the semiconductor metrology or inspection system 100.

Figure 10:
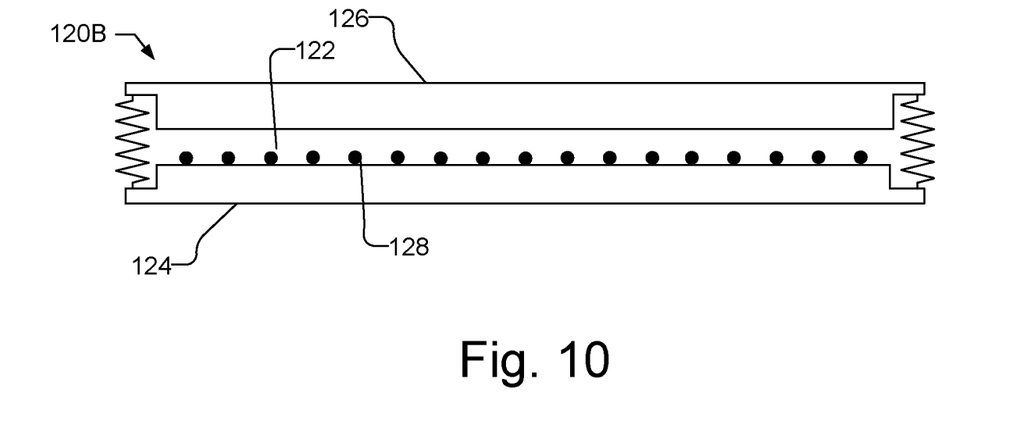
FIG. 10 illustrates a side view of an embodiment of an actively controlled damper with no lands and grooves.

FIG. 10 illustrates a side view of an embodiment of an actively controlled damper 120B, which is similar to the actively controlled damper 120 shown in FIG. 6, like designated elements being the same, but includes a pair of parallel plates without lands and grooves. As illustrated, at least one wire 128 is disposed between the parallel first plate 124 and the second plate 126 and, for example, may be fixed to the first plate 124, e.g., potted in epoxy to protect the wire. A controller 600, shown in FIG. 6, that is coupled to the wire 128, provides a current to the wire 128 to produce a magnetic field (or to produce a current across the fluid 122 if the fluid is an electrorheological fluid) to alter the viscosity of the fluid 122, thereby adjusting an amount of damping provided to the semiconductor metrology or inspection system 100.

Figure 11:
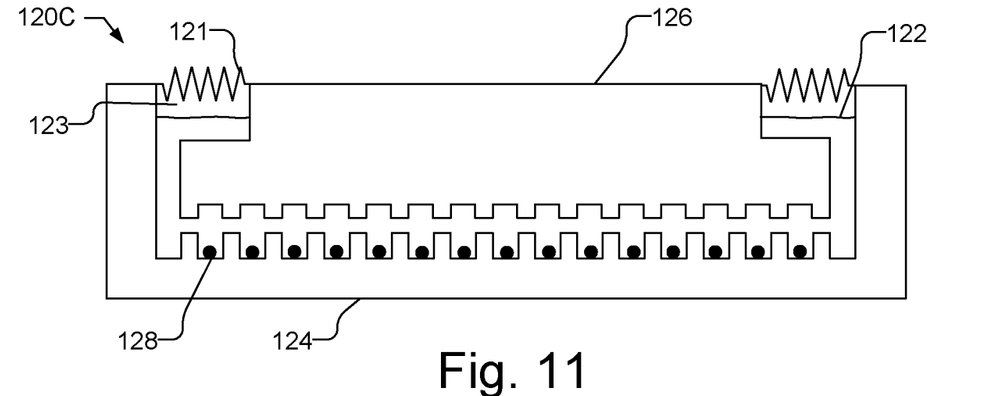
FIG. 11 illustrates a side view of an embodiment of an actively controlled damper with a flexible connectors located on a top surface of the damper.

FIG. 11 illustrates a side view of an embodiment of an actively controlled damper 120C, which is similar to the actively controlled damper 120 shown in FIG. 6, like designated elements being the same, but with flexible connectors 121 located on a top surface of the damper 120C, as opposed to the sidewall, as shown in FIG. 6. Damper 120C is illustrated with lands and grooves in both the first plate 124 and the second plate 126, but as discussed above, only one plate or neither plate may include lands and grooves. The fluid 122 with the controllable viscosity, e.g., the magnetorheological fluid or electrorheological fluid, is retained between the first plate 124 and the second plate 126, but as illustrated in FIG. 11, there may be headspace 123 between the fluid 122 and the flexible connectors 121. A controller 600, shown in FIG. 6, that is coupled to the wire 128, provides a current to the wire 128 to produce a magnetic field (or to produce a current across the fluid 122 if the fluid is an electrorheological fluid) to alter the viscosity of the fluid 122, thereby adjusting an amount of damping provided to the semiconductor metrology or inspection system 100.

Figure 12:
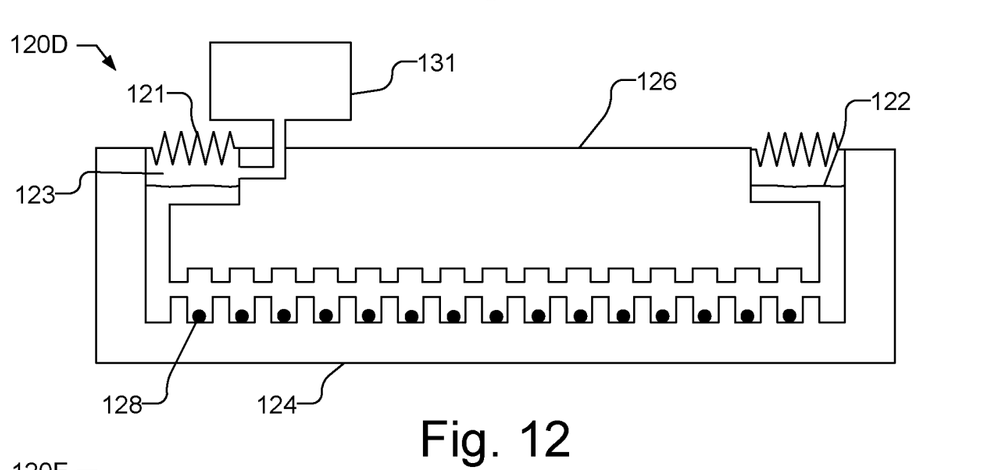
FIG. 12 illustrates a side view of an embodiment of an actively controlled damper with an air pressure regulator coupled to the headspace between the fluid and the flexible connectors.

FIG. 12 illustrates a side view of an embodiment of an actively controlled damper 120D, which is similar to the actively controlled damper 120 shown in FIG. 6, like designated elements being the same. Damper 120D is illustrated with lands and grooves in both the first plate 124 and the second plate 126, but as discussed above, only one plate or neither plate may include lands and grooves. Damper 120D is similar to damper 120C, shown in FIG. 11, with flexible connectors 121 located on a top surface of the damper 120D. Damper 120D, in addition, includes an air pressure regulator 131 that is coupled to the headspace 123 between the fluid 122 and the flexible connectors 121. The air pressure regulator 131 may be coupled to a pump or compressor (not shown) which is the source of the air. If desired, an inlet may be coupled to a pressure source, and an outlet may be coupled to a back pressure regulator or an adjustable valve to set a leak rate and pressure. Air pressure regulator 131 is illustrated as being coupled to the headspace 123 through the second plate 126, but it may be coupled to the headspace 123, e.g., through a side of the first plate 124 if desired. The air pressure regulator 131 may be used to control the pressure in the headspace 123, e.g., to alter the separation between the first plate 124 and the second plate 126, for example, to provide spring force to float the second plate 126. For example, the air pressure regulator 131 may increase pressure in the headspace 123 to increase the separation between the first plate 124 and the second plate 126 and may decrease pressure in the headspace 123 to decrease the separation between the first plate 124 and the second plate 126. A controller 600, shown in FIG. 6, that is coupled to the wire 128, provides a current to the wire 128 to produce a magnetic field (or to produce a current across the fluid 122 if the fluid is an electrorheological fluid) to alter the viscosity of the fluid 122, thereby adjusting an amount of damping provided to the semiconductor metrology or inspection system 100.

Figure 13:
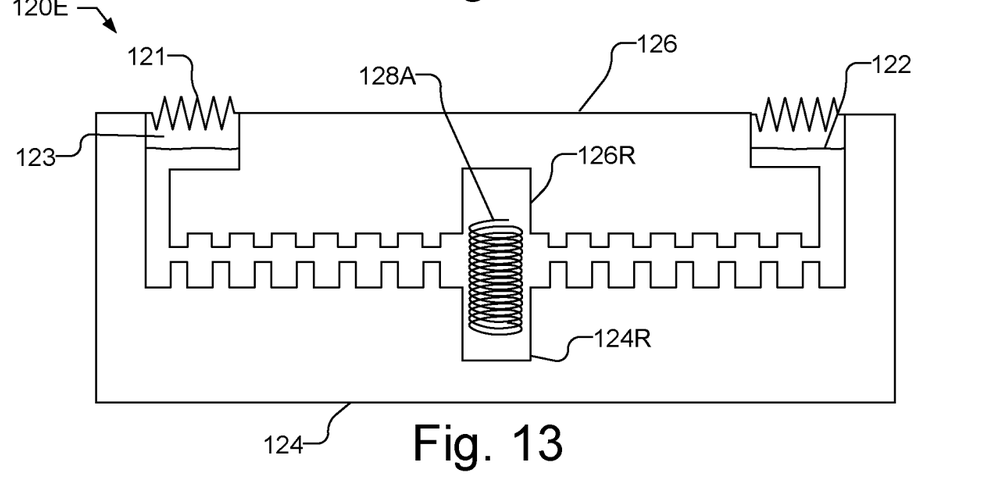
FIG. 13 illustrates a side view of an embodiment of an actively controlled damper with a cylindrically coiled wire between the plates.

FIG. 13 illustrates a side view of an embodiment of an actively controlled damper 120E, which is similar to the actively controlled damper 120 shown in FIG. 6, like designated elements being the same. Damper 120E is illustrated with lands and grooves in both the first plate 124 and the second plate 126, but as discussed above, only one plate or neither plate may include lands and grooves. Damper 120E is similar to damper 120C, shown in FIG. 11, with flexible connectors 121 located on a top surface of the damper 120E, although, if desired, flexible connectors 121 may be located on a sidewall, as illustrated in FIG. 6. The fluid 122 with the controllable viscosity, e.g., the magnetorheological fluid or electrorheological fluid, is retained between the first plate 124 and the second plate 126. Damper 120E includes at least one wire 128A between the first plate 124 and the second plate 126 in the form of a cylindrical coil. The coiled wire 128A may be positioned, e.g., in recesses 124R and 126R at the center of the first plate 124 and second plate 126, respectively. Thus, the coiled wire 128A may be a cylindrical coil nested include a cylinder (formed by the recesses 124R and 126R. If desired, multiple coiled wires may be positioned, e.g., in multiple recesses at distributed locations in the first plate 124 and the second plate 126. Damper 120E uses a controller 600, shown in FIG. 6, that is coupled to the wire 128A, to provide a current to the wire 128A to produce a magnetic field (or to produce a current across the fluid 122 if the fluid is an electrorheological fluid) to alter the viscosity of the fluid 122, thereby adjusting an amount of damping provided to the semiconductor metrology or inspection system 100.

Figure 14:
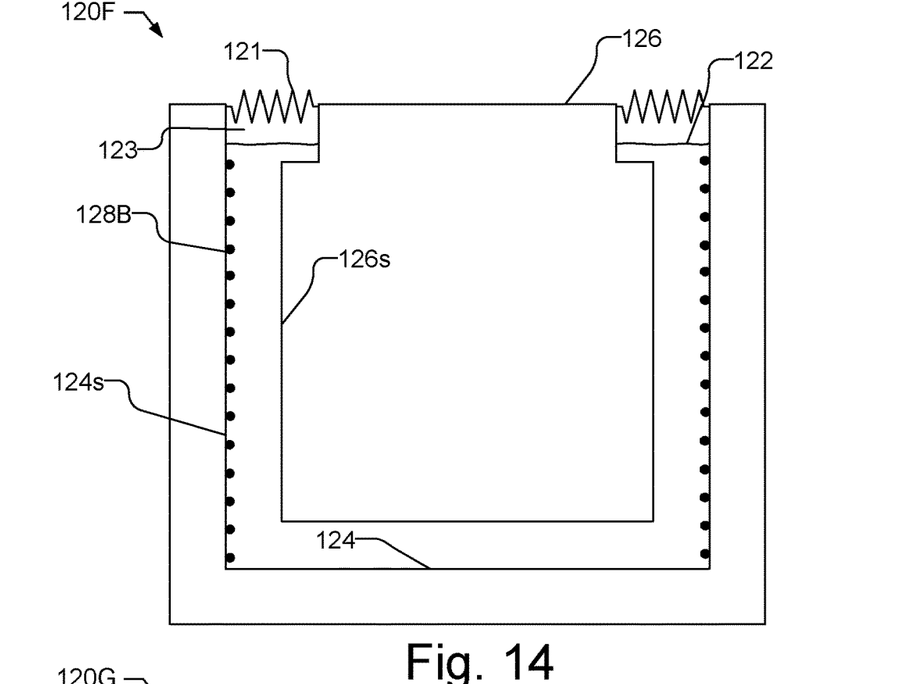
FIG. 14 illustrates a side view of an embodiment of an actively controlled damper with a coiled wire nested between a cylinder formed by a first plate and a piston formed by a second plate.

FIG. 14 illustrates a side view of an embodiment of an actively controlled damper 120F, which is similar to the actively controlled damper 120 shown in FIG. 6, like designated elements being the same. Damper 120F is illustrated with no lands and grooves, but as discussed above, if desired one or both the first plate 124 and the second plate 126 may include lands and grooves. Damper 120F is similar to damper 120C, shown in FIG. 11, with flexible connectors 121 located on a top surface of the damper 120F. The fluid 122 with the controllable viscosity, e.g., the magnetorheological fluid or electrorheological fluid, is retained between the first plate 124 and the second plate 126. Damper 120F includes at least one wire 128B between the first plate 124 and the second plate 126 in the form of a cylindrical coil. The coiled wire 128B may be positioned, e.g., around a sidewall 124s formed by the first plate 124, but may be around a sidewall 126s formed by the second plate 126. Thus, the coiled wire 128B may be a cylindrical coil nested between a cylinder (formed by the sidewall 124s of the first plate 124) and a piston (formed by the second plate 126). If desired, the cross-section of the first plate 124 and second plate 126 may be round, square, rectangular, or other shape. Damper 120F uses a controller 600, shown in FIG. 6, that is coupled to the wire 128B, to provide a current to the wire 128B to produce a magnetic field (or to produce a current across the fluid 122 if the fluid is an electrorheological fluid) to alter the viscosity of the fluid 122, thereby adjusting an amount of damping provided to the semiconductor metrology or inspection system 100.

Figure 15:
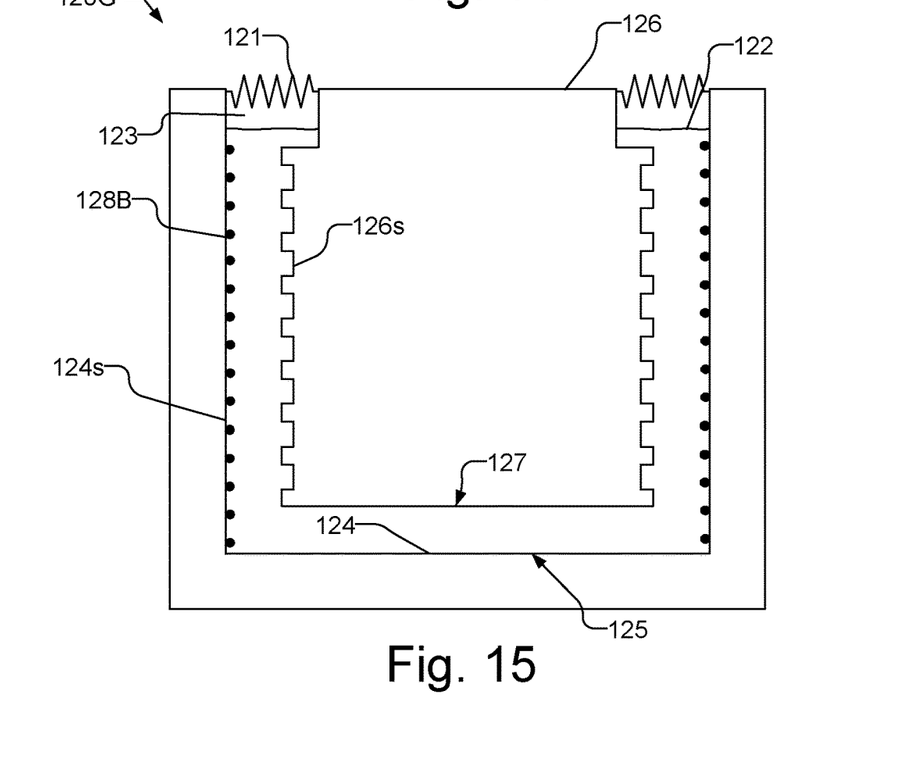
FIG. 15 illustrates a side view of an embodiment of an actively controlled damper with a coiled wire nested between a cylinder formed by a first plate and a piston formed by a second plate where the first plate includes lands and grooves on a sidewall.

FIG. 15 illustrates a side view of an embodiment of an actively controlled damper 120G, which is similar to the actively controlled damper 120 shown in FIG. 6, like designated elements being the same. Damper 120G is similar to damper 120F, shown in FIG. 14, with the at least one wire 128B between the first plate 124 and the second plate 126 in the form of a cylindrical coil positioned around sidewall 124s of the first plate 124, but may be positioned around the sidewall 126s of the second plate 126. As illustrated in FIG. 15, damper 120G illustrated with lands and grooves on the sidewall 126s of the second plate 126. If desired, the sidewall 124s of the first plate 124 may also include lands and grooves. Moreover, if desired, similar to damper 120 shown in FIG. 6, one, both or neither of the top surface 125 of the first plate 124 and the bottom surface 127 of the second plate 126 may include lands and grooves. Damper 120G uses a controller 600, shown in FIG. 6, that is coupled to the wire 128B, to provide a current to the wire 128B to produce a magnetic field (or to produce a current across the fluid 122 if the fluid is an electrorheological fluid) to alter the viscosity of the fluid 122, thereby adjusting an amount of damping provided to the semiconductor metrology or inspection system 100.

Figure 16:
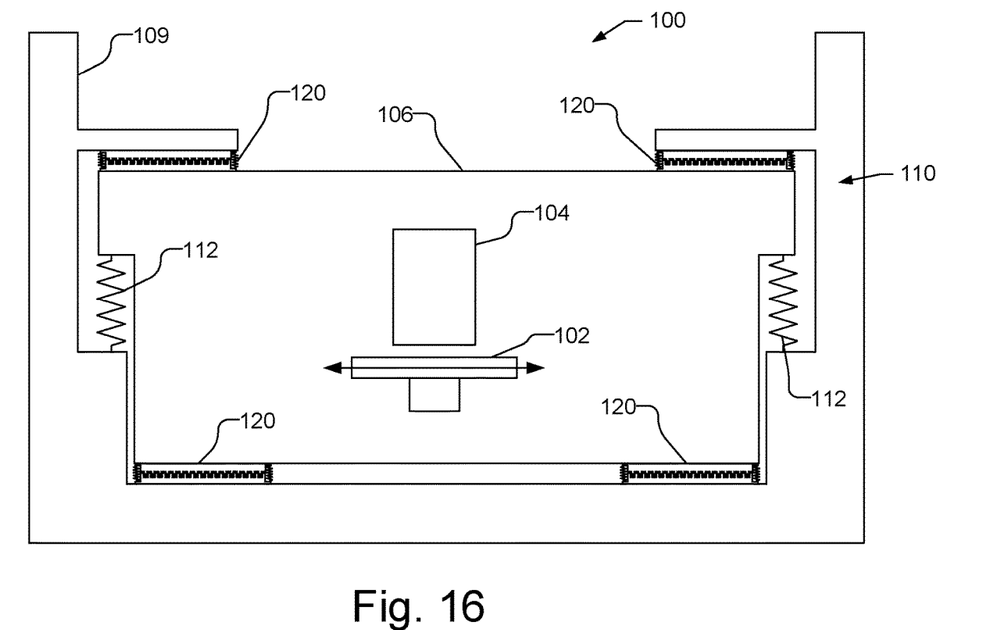
FIG. 16 is a more detailed view of a semiconductor metrology or inspection system with an actively controlled vibration isolation system.

FIG. 16 is a more detailed view of the semiconductor metrology or inspection system 100 with the vibration isolation system 110. As illustrated, the vibration isolation system 110 may include a number, e.g., four, actively controlled dampers 120 and a number, e.g., two, passive isolation mounts 112 between the housing 106 and a frame 109, e.g., mechanical ground. It should be understood that any number of passive isolation mounts 112 and actively controlled dampers 120 may be used. Moreover, as illustrated, the placement of actively controlled dampers 120 (as well as the passive isolation mounts 112) is not limited to being under the housing 106 but may above as well as on the sides of the housing 106. The housing 106 is illustrated as containing the stage 102 and optical head 104, which may be isolated within the housing.

Figure 17:
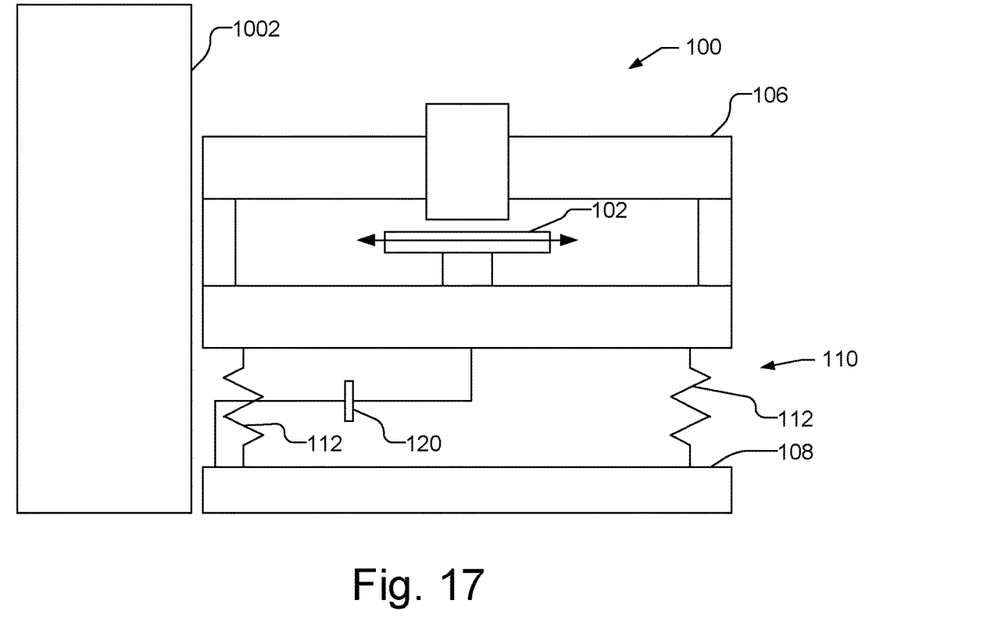
FIG. 17 illustrates another implementation of a semiconductor metrology or inspection system attached to an Equipment Front End Module (EFEM) with an actively controlled vibration isolation system.

FIG. 17 illustrates another implementation of a semiconductor metrology or inspection system 100, in which the housing 106 is attached to an Equipment Front End Module (EFEM) 1009. As illustrated, the vibration isolation system 110 is coupled between the semiconductor metrology or inspection system 100 and the floor 108 or a frame. The passive isolation mounts 112, e.g., springs or elastomer mounts, provide support and may provide some damping, primarily for the isolation of vertical and tilt vibration, while one or more actively controlled dampers 120 is positioned to provide damping in the direction of the EFEM 1002, e.g., horizontally, where a robot loads and un-loads wafers onto stage 102. It should be understood that the passive isolation mounts 112 may be a combination of materials, such as spring and damping materials and may not be a single component. Further, additional actively controlled dampers 120 may be provided for damping in other directions, e.g., in the vertical direction. The actively controlled damper 120 may be controlled to provide all damping in the horizontal direction during stage moves or when a wafer is loaded or un-loaded from the semiconductor metrology or inspection system 100. Alternatively, the passive isolation mounts 112, or additional passive isolation mounts 112, may provide some support and damping in the horizontal direction and the actively controlled damper 120 may be controlled to provide additional damping during stage moves or when a wafer is loaded or un-loaded from the semiconductor metrology or inspection system 100.

Figure 18:
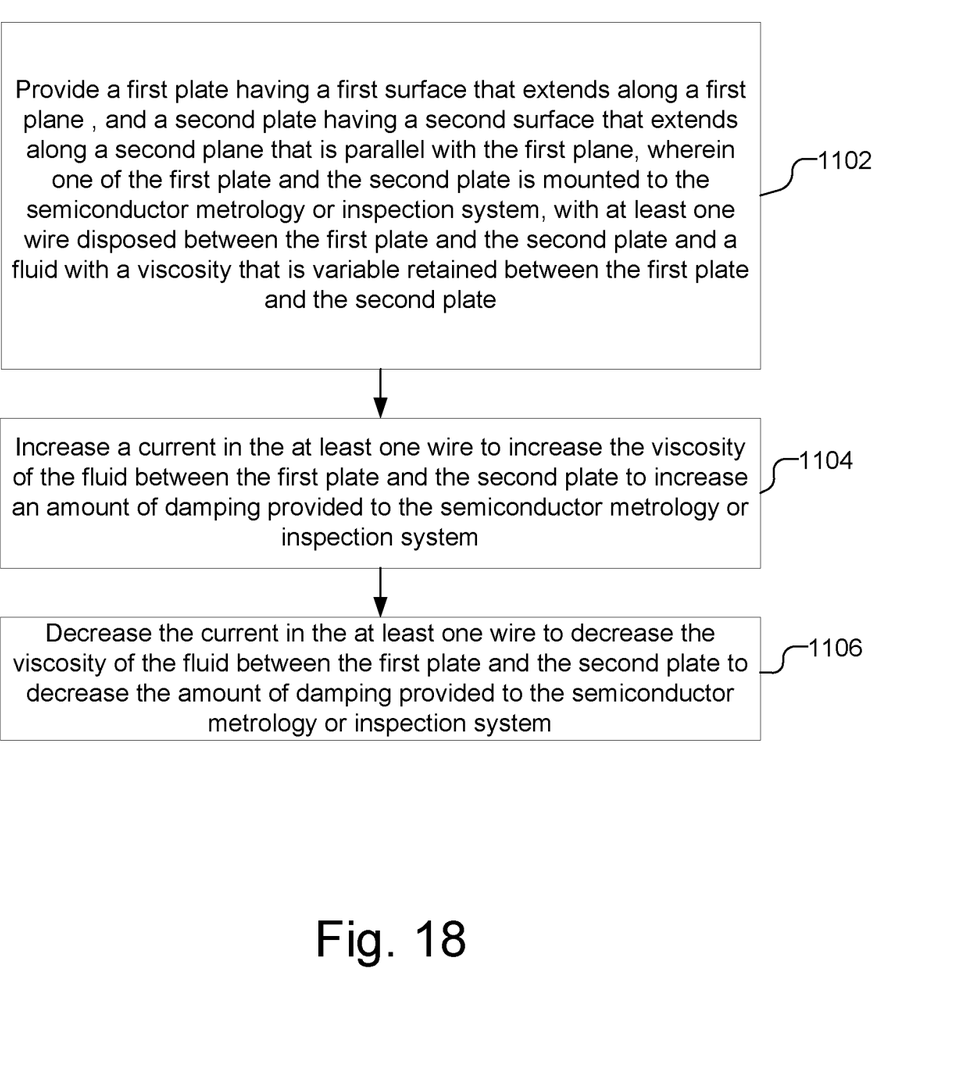
FIG. 18 is a flow chart illustrating a method of actively damping vibration of a semiconductor metrology or inspection system using an actively controlled damper.

FIG. 18 is a flow chart illustrating a method of controlling damping vibration of a semiconductor metrology or inspection system, such as semiconductor metrology or inspection system 100. As illustrated, a first plate is provided having a first surface that extends along a first plane, and a second plate having a second surface that extends along a second plane that is parallel with the first plane, wherein one of the first plate and the second plate is mounted to the semiconductor metrology or inspection system, with at least one wire disposed between the first plate and the second plate and a fluid with a viscosity that is variable retained between the first plate and the second plate (1102). The damping to the semiconductor metrology or inspection system in some implementations has six-degrees-of-freedom. In some implementations, the first plate may include a first set of lands and grooves in the second surface. The at least one wire may be disposed in the grooves of the first set of lands and grooves. In some implementations, the second plate may include a second set of lands and grooves in the second surface. For example, the lands from the first set of lands and grooves may fit within the grooves of the second set grooves and the lands from the second set of lands and grooves may fit within the grooves of the first set of grooves. In some implementations, the first set of lands and grooves in the first surface extend in one of a spiral shape, a plurality of concentric circles or lines across the first surface. In some implementations, the semiconductor metrology or inspection system is supported with a passive isolation mount mounted between the semiconductor metrology or inspection system and a frame or ground.

A current is increased in the at least one wire to increase the viscosity of the fluid between the first plate and the second plate to increase an amount of damping provided to the semiconductor metrology or inspection system (1104). The current is decreased in the at least one wire to decrease the viscosity of the fluid between the first plate and the second plate to decrease the amount of damping provided to the semiconductor metrology or inspection system (1106). For example, the current may be decreased in the at least one wire by providing no current to the wire. In some implementations, the current in the at least one wire produces a magnetic field and the fluid is a magnetorheological fluid. In some implementations, the current in the at least one wire produces a current through the fluid and the fluid is an electrorheological fluid.

In some implementations, the semiconductor metrology or inspection system may include a stage that moves, wherein increasing the current in the at least one wire to increase the viscosity of the fluid between the first plate and the second plate to increase the amount of damping provided to the semiconductor metrology or inspection system is performed during movement of the stage in the semiconductor metrology or inspection system; and wherein decreasing the current in the at least one wire to decrease the viscosity of the fluid between the first plate and the second plate to decrease the amount of damping provided to the semiconductor metrology or inspection system is performed when there is no movement of the stage. In some implementations, the movement of the stage may be to produces relative movement between a sample and an optical system of the semiconductor metrology or inspection system. In some implementations, the movement of the stage may be to move a sample to an unload position, where the method may further include unloading the sample from the stage of the semiconductor metrology or inspection system; loading a new sample onto the stage of the semiconductor metrology or inspection system; increasing the current in the wire to increase the viscosity of the fluid between the first plate and the second plate to increase the amount of damping while moving the stage in the semiconductor metrology or inspection system to position the new sample at a first measurement location or deskew location; stopping the movement of the stage; and decreasing the current in the wire to decrease the viscosity of the fluid between the first plate and the second plate to decrease the amount of damping.

In some implementations, the semiconductor metrology or inspection system may include a stage that moves, wherein increasing the current in the at least one wire to increase the viscosity of the fluid between the first plate and the second plate to increase the amount of damping provided to the semiconductor metrology or inspection system and decreasing the current in the at least one wire to decrease the viscosity of the fluid between the first plate and the second plate to decrease the amount of damping provided to the semiconductor metrology or inspection system are performed to dynamically adjust the damping of the semiconductor metrology or inspection system during movement of the stage. In some implementations, for example, the movement of the stage may be to scan or map the sample.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A damper for a semiconductor metrology or inspection system, the damper comprising
    a first plate having a first surface that extends along a first plane;
    a second plate having a second surface that extends along a second plane that is parallel with the first plane, wherein one of the first plate and the second plate is configured to be mounted to the semiconductor metrology or inspection system;
    at least one wire disposed between the first plate and the second plate;
    a fluid with a viscosity that is variable and is retained between the first plate and the second plate, wherein the at least one wire is disposed between the fluid and at least one of the first plate and the second plate; and
    a controller coupled to the at least one wire and configured to provide a current to the at least one wire between the fluid and at least one of the first plate and the second plate to alter the viscosity of the fluid to adjust an amount of damping provided to the semiconductor metrology or inspection system.

2. The damper of claim 1, further comprising:
    a passive isolation mount configured to be mounted to the semiconductor metrology or inspection system.

3. The damper of claim 2, wherein the passive isolation mount and the one of the first plate and the second plate are configured to be both mounted between the semiconductor metrology or inspection system and a frame or ground, and wherein the passive isolation mount supports the semiconductor metrology or inspection system.

4. The damper of claim 2, wherein the passive isolation mount comprises a spring mount, an elastomer mount, or an air isolator.

5. The damper of claim 1, wherein the controller is configured to increase the amount of damping while a stage in the semiconductor metrology or inspection system is moving and to decrease the amount of damping while the stage is not moving.

6. The damper of claim 1, further comprising a sidewall around the first plate and the second plate and retaining the fluid.

7. The damper of claim 6, wherein the sidewall is flexible and is connected between the first plate and the second plate.

8. The damper of claim 1, wherein the fluid comprises an electrorheological fluid or a magnetorheological fluid.

9. The damper of claim 1, wherein the first plate includes a first set of lands and grooves in the second surface.

10. The damper of claim 9, wherein the at least one wire is disposed in the grooves of the first set of lands and grooves.

11. The damper of claim 9, wherein the second plate includes a second set of lands and grooves in the second surface.

12. The damper of claim 11, wherein the lands from the first set of lands and grooves fit within the grooves of the second set of lands and grooves and the lands from the second set of lands and grooves fit within the grooves of the first set of lands and grooves.

13. The damper of claim 9, wherein the first set of lands and grooves in the first surface extend in one of a spiral shape, a plurality of concentric circles or lines across the first surface.

14. The damper of claim 1, wherein the damper provides damping to the semiconductor metrology or inspection system with six-degrees-of-freedom.

15. A method of controlling damping vibration of a semiconductor metrology or inspection system, the method comprising:
    providing a first plate having a first surface that extends along a first plane, and a second plate having a second surface that extends along a second plane that is parallel with the first plane, wherein one of the first plate and the second plate is mounted to the semiconductor metrology or inspection system, with at least one wire disposed between the first plate and the second plate and a fluid with a viscosity that is variable retained between the first plate and the second plate, wherein the at least one wire is disposed between the fluid and at least one of the first plate and the second plate;
    increasing a current in the at least one wire between the fluid and the at least one of the first plate and the second plate to increase the viscosity of the fluid between the first plate and the second plate to increase an amount of damping provided to the semiconductor metrology or inspection system; and decreasing the current in the at least one wire between the fluid and the at least one of the first plate and the second plate to decrease the viscosity of the fluid between the first plate and the second plate to decrease the amount of damping provided to the semiconductor metrology or inspection system.

16. The method of claim 15, wherein the first plate includes a first set of lands and grooves in the first surface.

17. The method of claim 16, wherein the at least one wire is disposed in the grooves of the first set of lands and grooves.

18. The method of claim 16, wherein the second plate includes a second set of lands and grooves in the second surface.

19. The method of claim 18, wherein the lands from the first set of lands and grooves fit within the grooves of the second set lands and grooves and the lands from the second set of lands and grooves fit within the grooves of the first set of lands and grooves.

20. The method of claim 16, wherein the first set of lands and grooves in the first surface extend in one of a spiral shape, a plurality of concentric circles or lines across the first surface.

21. The method of claim 15, wherein damping in the semiconductor metrology or inspection system has six-degrees-of-freedom.

22. The method of claim 15, wherein decreasing the current in the at least one wire comprises providing no current to the at least one wire.

23. The method of claim 15, wherein the current in the at least one wire produces a magnetic field and the fluid comprises a magnetorheological fluid.

24. The method of claim 15, wherein the current in the at least one wire produces a current through the fluid and the fluid comprises an electrorheological fluid.

25. The method of claim 15, supporting the semiconductor metrology or inspection system with a passive isolation mount mounted between the semiconductor metrology or inspection system and a frame or ground.

26. The method of claim 15, wherein the semiconductor metrology or inspection system comprises a stage that moves, wherein increasing the current in the at least one wire to increase the viscosity of the fluid between the first plate and the second plate to increase the amount of damping provided to the semiconductor metrology or inspection system is performed during movement of the stage in the semiconductor metrology or inspection system;

and wherein decreasing the current in the at least one wire to decrease the viscosity of the fluid between the first plate and the second plate to decrease the amount of damping provided to the semiconductor metrology or inspection system is performed when there is no movement of the stage.

27. The method of claim 26, wherein the movement of the stage produces relative movement between a sample and an optical system of the semiconductor metrology or inspection system.

28. The method of claim 26, wherein the movement of the stage is to move a sample to an unload position, the method further comprising:
  unloading the sample from the stage of the semiconductor metrology or inspection system;
  loading a new sample onto the stage of the semiconductor metrology or inspection system;
  increasing the current in the at least one wire to increase the viscosity of the fluid between the first plate and the second plate to increase the amount of damping while moving the stage in the semiconductor metrology or inspection system to position the new sample at a first measurement location or deskew location;
  stopping the movement of the stage; and
  decreasing the current in the at least one wire to decrease the viscosity of the fluid between the first plate and the second plate to decrease the amount of damping.

29. The method of claim 15, wherein the semiconductor metrology or inspection system comprises a stage that moves, wherein increasing the current in the at least one wire to increase the viscosity of the fluid between the first plate and the second plate to increase the amount of damping provided to the semiconductor metrology or inspection system and decreasing the current in the at least one wire to decrease the viscosity of the fluid between the first plate and the second plate to decrease the amount of damping provided to the semiconductor metrology or inspection system are performed to dynamically adjust the amount of damping of the semiconductor metrology or inspection system during movement of the stage.

30. The method of claim 29, wherein the movement of the stage is to scan or map a sample.

31. A damper for a semiconductor metrology or inspection system having a stage that moves, the damper comprising
  a pair of parallel plates, wherein one of the parallel plates is configured to be mounted to the semiconductor metrology or inspection system;
  at least one wire disposed between the pair of parallel plates;
  a fluid with a viscosity that is variable and is retained between the pair of parallel plates, wherein the at least one wire is disposed between the fluid and at least one of a first plate and a second plate; and
  a controller coupled to the at least one wire, the controller being configured to vary a current applied to the at least one wire between the fluid and the at least one of the first plate and the second plate to adjust the viscosity of the fluid to alter damping of the semiconductor metrology or inspection system based on movement of the stage.

32. The damper of claim 31, wherein the movement of the stage produces relative movement between a sample and an optical system of the semiconductor metrology or inspection system.

33. The damper of claim 31, wherein the movement of the stage is to scan or map a sample and the controller is configured to dynamically vary the current during movement of the stage.

34. The damper of claim 31, wherein the movement of the stage is to move a sample from one measurement location to a next measurement location or to move the sample to an unload position and the controller is configured to increase the current to increase the viscosity of the fluid to increase an amount of damping provided to the semiconductor metrology or inspection system during movement of the stage and to decrease the current to decrease the viscosity of the fluid to decrease the amount of damping provided to the semiconductor metrology or inspection system when there is no movement of the stage.

35. The damper of claim 31, further comprising a sidewall around the pair of parallel plates and retaining the fluid.

36. The damper of claim 35, wherein the sidewall is flexible and is connected between the pair of parallel plates.

37. The damper of claim 31, wherein the fluid comprises an electrorheological fluid or a magnetorheological fluid.

38. The damper of claim 31, wherein the pair of parallel plates comprises at least one plate having a set of lands and grooves.

39. The damper of claim 38, wherein the at least one wire is disposed in the grooves of the at least one plate.

40. The damper of claim 38, wherein the set of lands and grooves is a first set of lands and grooves on a first plate in the pair of parallel plates, and further comprising a second set of lands and grooves on a second plate in the pair of parallel plates, wherein the lands from the first set of lands and grooves fit within the grooves of the second set of lands and grooves and the lands from the second set of lands and grooves fit within the grooves of the first set of lands and grooves.

41. The damper of claim 40, wherein the first set of lands and grooves on the first plate extend in one of a spiral shape, a plurality of concentric circles or lines across the first plate.

42. The damper of claim 31, wherein the damper provides damping to the semiconductor metrology or inspection system with six-degrees-of-freedom.

* * * * *